United States Patent
Takatsugi (10) Patent No.: US 9,120,263 B2
(45) Date of Patent: Sep. 1, 2015

(54) CLAMPING DEVICE OF INJECTION MOLDING MACHINE

(71) Applicant: FANUC Corporation, Yamanashi (JP)

(72) Inventor: Satoshi Takatsugi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/183,249

(22) Filed: Feb. 18, 2014

(65) Prior Publication Data
US 2014/0242207 A1 Aug. 28, 2014

(30) Foreign Application Priority Data

Feb. 22, 2013 (JP) ................................ 2013-033728

(51) Int. Cl.

| | |
|---|---|
| *B29C 45/80* | (2006.01) |
| *B29C 45/64* | (2006.01) |
| *B29C 45/72* | (2006.01) |
| *B29C 45/78* | (2006.01) |
| B29C 45/17 | (2006.01) |
| B29C 45/76 | (2006.01) |

(52) U.S. Cl.
CPC ................ *B29C 45/64* (2013.01); *B29C 45/72* (2013.01); *B29C 45/78* (2013.01); B29C 45/1742 (2013.01); B29C 45/7653 (2013.01); B29C 45/80 (2013.01); B29C 2945/7604 (2013.01); B29C 2945/76096 (2013.01); B29C 2945/76227 (2013.01); B29C 2945/76234 (2013.01); B29C 2945/76391 (2013.01); B29C 2945/76531 (2013.01); B29C 2945/76705 (2013.01); B29C 2945/76712 (2013.01); B29C 2945/76869 (2013.01)

(58) Field of Classification Search
CPC  B29C 45/1742; B29C 45/64; B29C 45/7653; B29C 45/78; B29C 45/80; B29C 2945/76227; B29C 2945/76234; B29C 2945/76391; B29C 2945/76531; B29C 2945/76705; B29C 2945/76712
USPC .......................... 425/143, 150, 589, 593, 595
See application file for complete search history.

(56) References Cited

U.S. PATENT DOCUMENTS

| | | | | |
|---|---|---|---|---|
| 4,345,890 | A * | 8/1982 | Hemmi et al. | 425/143 |
| 5,161,594 | A * | 11/1992 | Bolton et al. | 164/312 |
| 5,753,153 | A * | 5/1998 | Choi | 425/595 |
| 7,326,375 | B2 * | 2/2008 | Nishimoto et al. | 425/808 |
| 7,458,796 | B2 * | 12/2008 | Morii | 425/143 |
| 2006/0286198 | A1 | 12/2006 | Morii | |

FOREIGN PATENT DOCUMENTS

| | | |
|---|---|---|
| JP | 62-264921 A | 11/1987 |
| JP | 2-75499 A | 3/1990 |

(Continued)

OTHER PUBLICATIONS

Office Action mailed Jun. 10, 2014, corresponds to Japanese patent application No. 2013-033728.

*Primary Examiner* — James Mackey
(74) *Attorney, Agent, or Firm* — Lowe Hauptman & Ham, LLP (57) ABSTRACT

An adaptor plate is provided between a platen and a mold to measure a temperature of each of divided regions obtained by dividing the adaptor plate into a plurality of regions and adjust a temperature for each of the regions. By doing so, it is possible to adjust the temperature at points closer to the center of the mold than tie bars. Further, by adjusting the temperature of the adaptor plate provided between the platen and the mold, it is possible to precisely adjust a tie bar balance and a platen parallelism even during molding.

6 Claims, 8 Drawing Sheets

(56) References Cited

FOREIGN PATENT DOCUMENTS

| JP | 5124074 A | 5/1993 |
| JP | 10286858 A | 10/1998 |
| JP | 11240055 A | 9/1999 |
| JP | 2000-271981 A | 10/2000 |
| JP | 2006-212980 A | 8/2006 |
| JP | 2006-347078 A | 12/2006 |

* cited by examiner

CLAMPING DEVICE OF INJECTION MOLDING MACHINE

RELATED APPLICATIONS

The present application claims priority to Japanese Application Number 2013-033728, filed Feb. 22, 2013, the disclosure of which is hereby incorporated by reference herein in its entirety.

BACKGROUND OF THE INVENTION

1. Field of the Invention

The present invention relates to a clamping device of an injection molding machine in which an adaptor plate is attached between a mold attachment surface of a platen and a mold fixed to this platen, and which controls a temperature of this adaptor plate.

2. Description of the Related Art

In a clamping device of an injection molding machine, a fixed platen and a rear platen are generally coupled by a plurality of tie bars. The fixed platen is fixed to tie bars by fixing platen nuts provided on a tie bar side. Similarly, the rear platen is also fixed to the tie bars by rear platen nuts provided on the tie bar side. The rear platen nuts are rotatably attached around the centers of tie bar shafts, so that, by rotating the rear platen nuts to move the rear platen forward and backward with respect to the fixed platen, it is possible to adjust the thickness of a mold.

Although most of injection molding machines use four tie bars, when stretch amounts of these four tie bars are different, the lengths of the tie bars differ and a parallelism (platen parallelism) of a mold attachment surface of the fixed platen and a mold attachment surface of a movable platen does not match in some cases. Hence, generally, clamping amounts of rear platen nuts are adjusted to precisely adjust the stretch amounts of the tie bars and the platen parallelism. However, the clamping amounts of the rear platen can be adjusted only before molding, and cannot be adjusted during molding.

(1) JP 2-75499 A and JP 2006-347078 A disclose techniques of attaching a heater to each tie bar, fluctuating a stretch amount of each tie bar byway of thermal expansion and adjusting a tie bar balance.

However, although this technique can adjust the tie bar balance and the platen parallelism by changing temperatures of tie bars and adjusting the stretch amounts of the tie bars, the final purpose of injection molding is to uniformly distribute a clamping force to an entire mold, and changing the temperatures of the tie bars and stretching the tie bars are indirect means and not direct one. Further, a center portion of the mold and the tie bars are slightly distant, and therefore there is a problem that it is not possible to make a mold surface pressure uniform even by adjusting the stretch amounts of the tie bars.

(2) JP 62-264921 A, JP 2000-271981 A and JP 2006-212980 A disclose techniques of canceling a difference between temperatures of sites of a platen and maintaining a fixed temperature over the entire platen.

However, this technique makes the temperature uniform over the entire platen, and, therefore, even when a tie bar balance is lost or the platen parallelism does not match due to, for example, a difference between stretch amounts of tie bars, the entire temperature is adjusted while the balance is lost and the parallelism does not match and there is a problem that it is not possible to adjust the tie bar balance or the platen parallelism.

SUMMARY OF THE INVENTION

In view of the problems of the above related art, it is therefore an object of the present invention to provide a clamping device of an injection molding machine in which an adaptor plate is provided between a platen and a mold and which can cause a difference in thermal expansion of the adaptor plate by using a temperature controller, thereby precisely adjusting a surface pressure balance of a mold and a platen parallelism.

According to the present invention, the adaptor plate which is at a position closer to a center of the mold than tie bars is provided between the platen and the mold, and the temperature controller adjusts the temperature of this adaptor plate based on data of variation of the tie bar balance or the platen parallelism. Consequently, it is possible to adjust the tie bar balance or the platen parallelism even during molding.

The present invention relates to a clamping device of an injection molding machine in which a rear platen and a fixed platen are coupled by a plurality of tie bars and in which a movable platen is arranged to be guided by the tie bars, and the clamping device has: an adaptor plate which is provided between the fixed platen and a fixed-side mold to be fixed to the fixed platen, and/or between the movable platen and a movable-side mold to be fixed to the movable platen; a temperature measuring unit which measures a temperature of each of a plurality of divided regions obtained by dividing the adaptor plate into a plurality of regions; a temperature adjusting unit which adjusts the temperature of each of the plurality of divided regions of the adaptor plate; and a control unit which causes the temperature adjusting unit to adjust the temperature of each of the plurality of divided regions of the adaptor plate.

According to the clamping device, distance sensors which measure distances between the fixed platen and the movable platen may be further provided above the adaptor plate, and near four corners of the mold and/or near points at which a center line of the mold and an outer periphery of the mold intersect, and, further, the control unit may control the temperature adjusting unit to adjust the temperature of each of the divided regions of the adaptor plate such that the distances between the fixed platen and the movable platen measured by the distance sensors are equal when a toggle is locked up.

According to the clamping device, a tie bar sensor which measures a stretch amount of a tie bar may be further provided to each of the plurality of tie bars, and, further, the control unit may control the temperature adjusting unit to adjust the temperature of each of the divided regions of the adaptor plate such that the stretch amount of each of the plurality of tie bars measured by the tie bar sensor is equal.

The temperature adjusting unit may be one of an electric heater, an electric heating/cooling element and a temperature controller which uses a fluid.

The clamping device may further have a target temperature setting unit which sets a target temperature of the temperature adjusting unit for each of the plurality of regions.

The present invention employs the above configuration and, consequently, can provide a clamping device of an injection molding machine which can precisely adjust a surface pressure balance of a mold and a platen parallelism and can perform adjustment even during molding.

BRIEF DESCRIPTION OF THE DRAWINGS

The above and other objects and features of the present invention will made obvious from the following description of embodiments with reference to the attached drawings. Of these drawings.

DETAILED DESCRIPTION OF THE PREFERRED EMBODIMENTS

Figure 1:
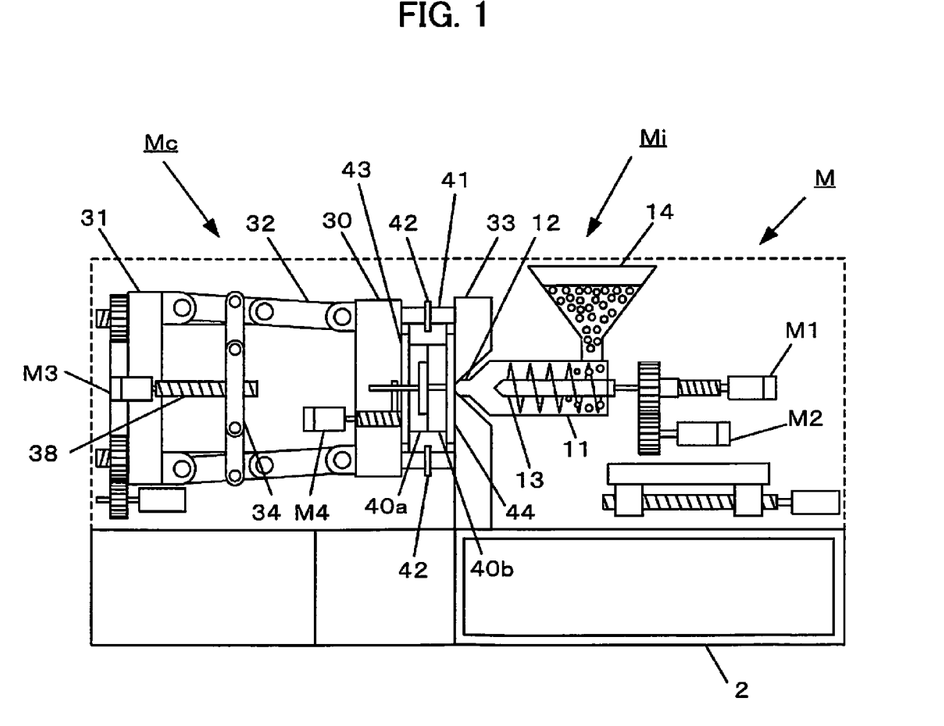
FIG. 1 is a view illustrating an entire configuration of an injection molding machine.

FIG. 1 is a view illustrating an entire configuration of an injection molding machine and illustrating a state where a clamping force is generated. An injection molding machine M has a clamping unit Mc and an injecting unit Mi on a machine base 2. The injecting unit Mi heats and melts a resin material (pellet), and injects the molten resin in a cavity of a mold 40. The clamping unit Mc opens and closes the mold 40 (a movable-side mold 40a and a fixed-side mold 40b).

First, the injecting unit Mi will be described. A nozzle 12 is attached to a front end of a cylinder 11, and a screw 13 is inserted in the cylinder 11. This screw 13 is rotated by a screw rotation servo motor M2, and is moved in an axis direction of the screw 13 by a screw forward/backward movement servo-motor M1. In addition, a hopper 14 supplies resin to the cylinder 11.

Next, the clamping unit Mc will be described. The clamping unit Mc has a movable platen 30, a rear platen 31, toggles 32, a fixed platen 33, a crosshead 34, a clamping servo motor M3 which moves the movable platen 30 forward and backward, a servo motor M4 which projects an ejector pin which pushes out a molded article from a mold and a ball screw shaft 38 which is driven by the clamping servo motor M3. The rear platen 31 and the fixed platen 33 are coupled by a plurality of tie bars 41, and the movable platen 30 is arranged to be guided by the tie bars 41.

The movable-side mold 40a is attached to the movable platen 30, and the fixed-side mold 40b is attached to the fixed platen 33. The movable-side mold 40a and the fixed-side mold 40b form the mold 40. The clamping servo motor M3 drives the ball screw shaft 38 and moves the crosshead 34 attached to this ball screw shaft 38 back-and-forth, so that it is possible to change a position of the movable platen 30. In this case, when the crosshead 34 is moved forward (moved in a right direction in FIG. 1), the movable platen 30 is moved forward and the mold is closed. Further, a clamping force obtained by multiplying a driving force of the clamping servo motor M3 by a toggle multiplying factor is generated, and clamping is performed based on the clamping force thus generated.

A molding operation using the injection molding machine M will be described. When the clamping servo motor M3 is rotated in a positive direction, the ball screw shaft 38 is rotated in the positive direction and the crosshead 34 screwed to the ball screw shaft 38 is moved forward (right direction in FIG. 1), whereas when the toggles 32 are operated, the movable platen 30 is moved forward.

When the movable-side mold 40a attached to the movable platen 30 comes into contact with the movable-side mold 40b attached to the fixed-side mold 40b (mold closed state), a clamping process starts. In the clamping process, when the clamping servo motor M3 is further driven in the positive direction, a clamping force is generated in the mold 40. Further, when the screw forward/backward movement servo motor M1 provided to the injecting unit Mi is driven and moves forward in the axis direction of the screw 13, molten resin is filled in a cavity space formed in the mold 40 (the movable-side mold 40a and the fixed-side mold 40b).

To open the mold, the clamping servo motor M3 is driven in a reverse direction, and the ball screw shaft 38 is rotated in the reverse direction. Subsequently, the crosshead 34 moves backward, and the movable platen 30 moves (moves backward) toward the rear platen 31. When the mold opening process is finished, the servo motor M4 which ejects an ejector pin (not illustrated) which pushes out a molded article from the movable-side mold 40a operates. With this operations, the ejector pin is ejected from an inner surface of the movable-side mold 40a, and the molded article within the movable-side mold 40a is ejected from the movable-side mold 40a.

According to the present invention, an adaptor plate 44 is provided between the fixed platen 33 and the fixed-side mold 40b, an adaptor plate 43 is provided between the movable platen 30 and the movable-side mold 40a, these adaptor plates 43 and 44 are divided into a plurality of regions and a temperature is adjusted in each of divided regions to adjust a tie bar balance and a platen parallelism. These adaptor plates 43 and 44 can be exchanged according to the mold 40.

According to a first embodiment of the present invention, tie bar sensors 42 provided at intermediate points of the tie bars 41 measure stretch amounts of the tie bars 41 and temperatures of the adaptor plates 43 and 44 are adjusted based on the measurement results to adjust the tie bar balance.

Further, according to another embodiment of the present invention, distances between the fixed platen 33 and the movable platen 30 are measured, the platen parallelism is calculated from the measurement results and the temperatures of the adaptor plates 43 and 44 are adjusted based on the calculated platen parallelism to adjust the platen parallelism.

Hereinafter, respective embodiments will be described.

First Embodiment

As illustrated in FIG. 1, tie bar sensors 42 which measure stretch amounts of tie bars are provided at intermediate points of a plurality of tie bars 41 to measure the stretch amounts of the tie bars 41. A sensor which is generally used, such as a distortion sensor which measures distortion of a material, can be used for this tie bar sensor 42.

Although an adaptor plate 43 provided to a movable platen 30 will be basically described, an adaptor plate 44 provided to a fixed platen 33 can employ the same configuration.

Figure 2:
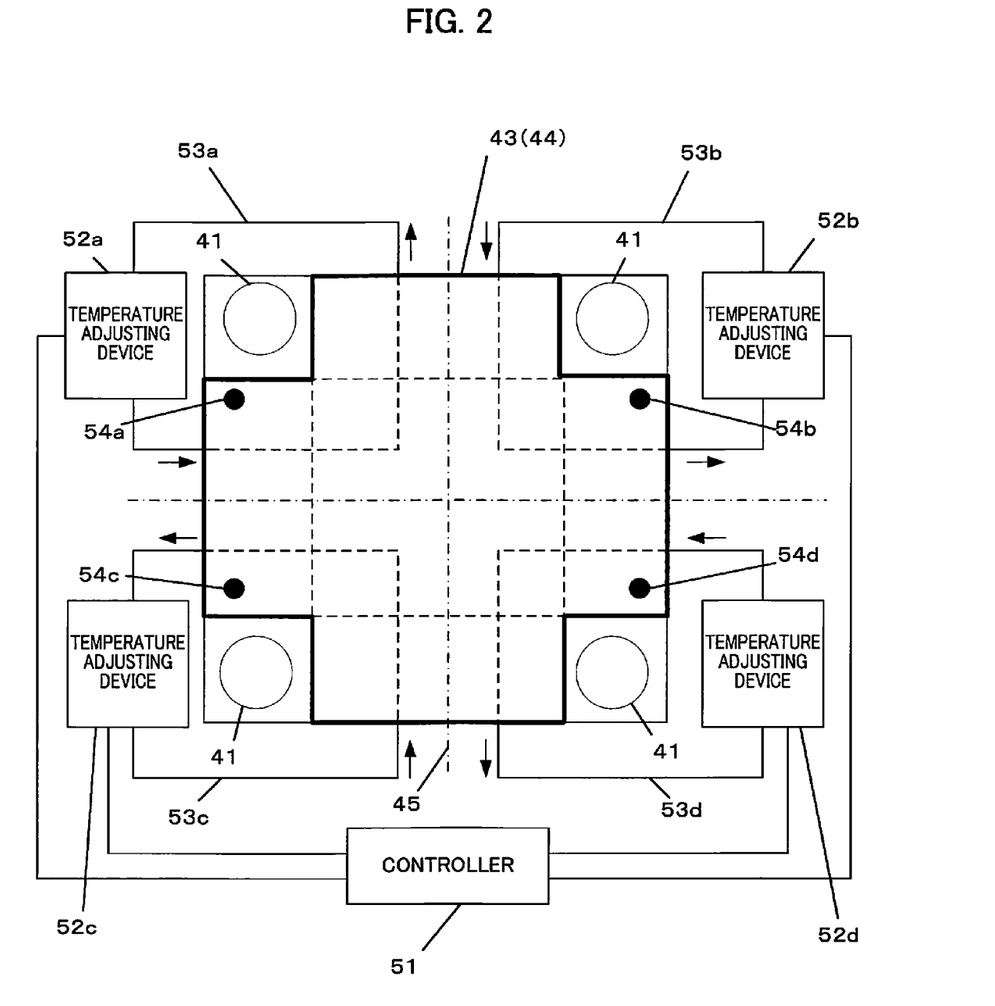
FIG. 2 illustrates an example of a configuration for adjusting a temperature wherein, in an adaptor plate provided between a fixed platen and a fixed-side mold or in an adaptor plate provided between a movable platen and a movable-side mold, a pipe in which water flows is installed in each of divided regions set to this adaptor plate.
Figure 5:
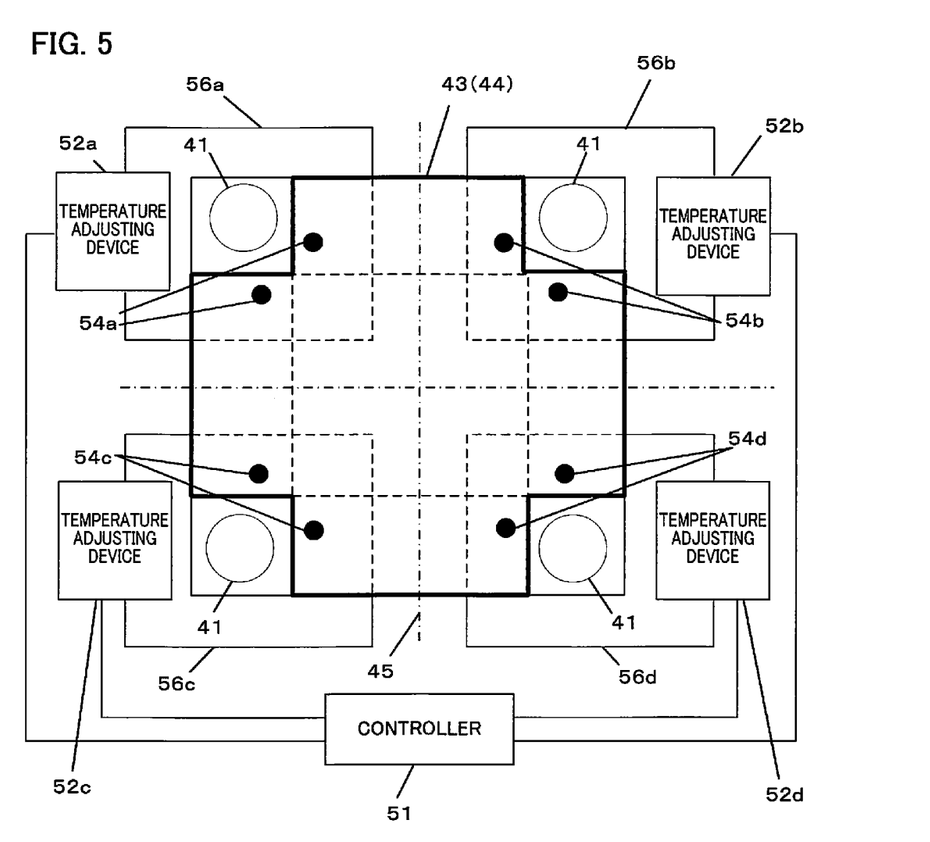
FIG. 5 is a view illustrating an example where heaters are arranged as a configuration for adjusting a temperature, instead of the pipes in which water flows in FIG. 2.

Means for adjusting a temperature is provided to the adaptor plate 43 and a specific example thereof is illustrated in FIGS. 2 and 5. FIG. 2 illustrates an example of a configuration for adjusting a temperature, wherein a water pipe 53 in which water flows is installed in each of divided regions. A temperature adjusting device adjusts the temperature of water flowing in the water pipe 53 to control the temperature of each region of the adaptor plate 43. Further, FIG. 5 is a view illustrating an example where heaters are arranged as a configuration for adjusting a temperature, instead of the water pipes illustrated in FIG. 2.

Figure 6:
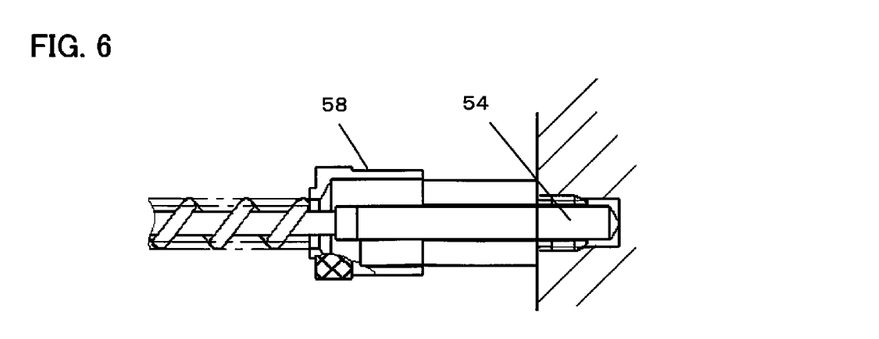
FIG. 6 is a view (cross-sectional view) explaining that a thermocouple as a temperature sensor is attached to the adaptor plate.

The adaptor plate 43 illustrated in FIGS. 2 and 5 is provided with temperature sensors 54 (54a, 54b, 54c and 54d) which measure the temperatures of the adaptor plate 43. Thermocouples can be used for these temperature sensors 54, and FIG. 6 illustrates how the temperature sensor 54 (thermocouple) is attached. A hole to attach the thermocouple is provided in the adaptor plate 43, and the thermocouple (temperature sensor 54) fitted to a socket 58 as illustrated in FIG. 6 is fixed by fixing means such as screwing. The socket 58 has a signal line which is not illustrated, and a detection signal from the thermocouple is input to a controller 51 of an injection molding machine M.

Figure 7A:
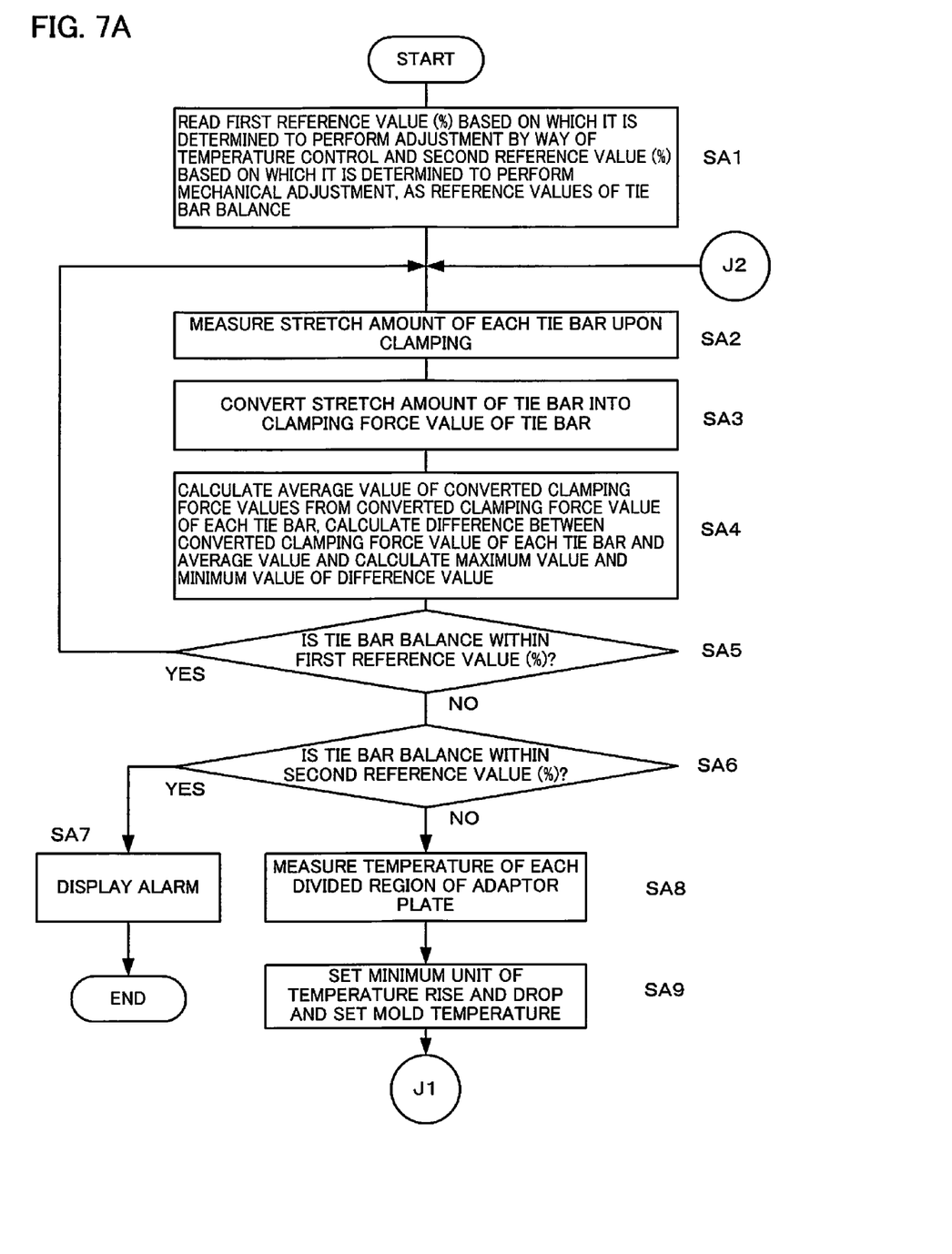
FIGS. 7A and 7B are flowcharts explaining procedures of processing executed by a clamping device according to a first embodiment of the present invention to measure stretch amounts of tie bars and adjust a temperature.
Figure 7B:
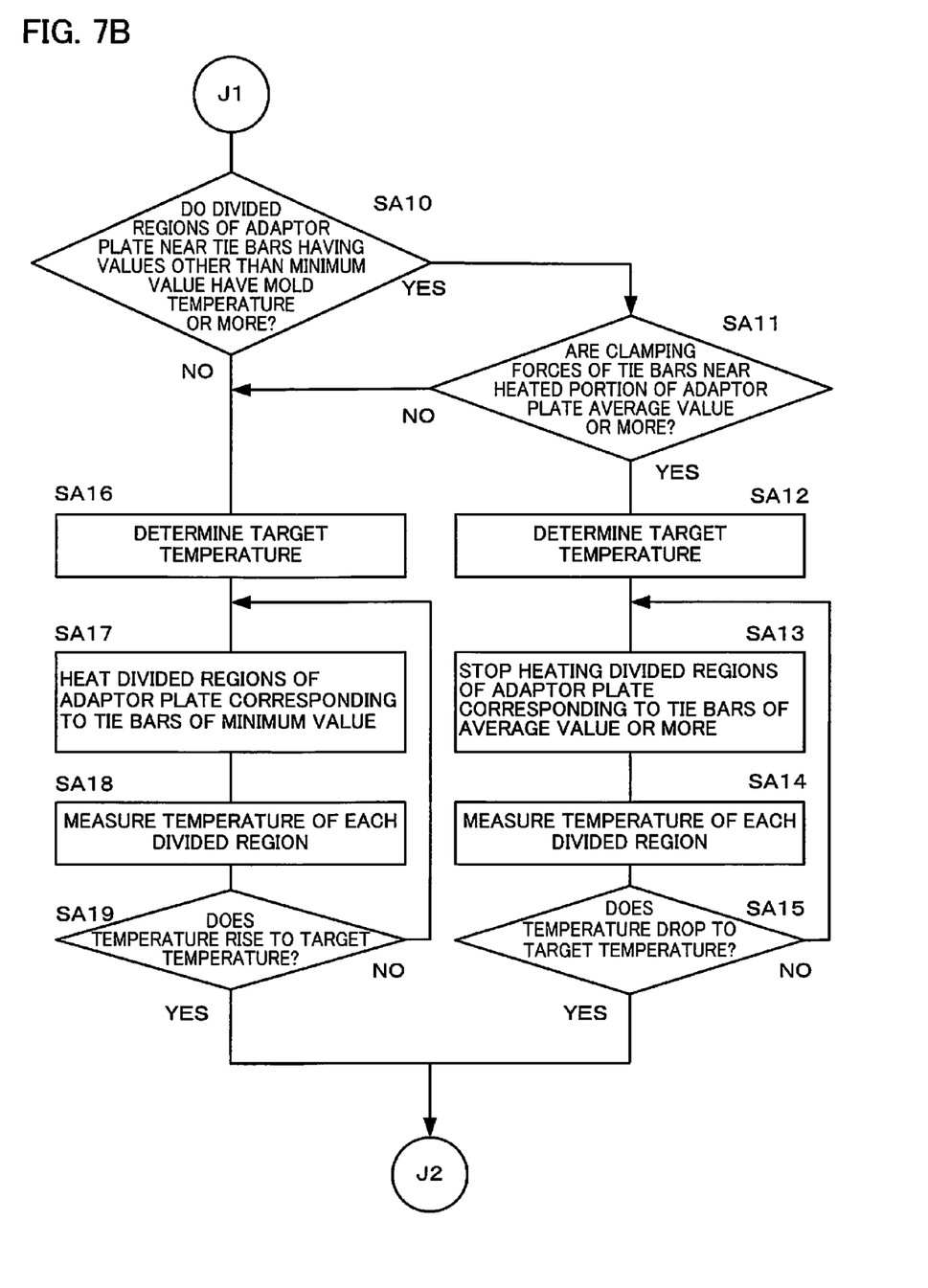

Next, procedures of processing executed by a clamping device according to the present embodiment to measure stretch amounts of the tie bars 41 and adjust the temperature will be described using flowcharts in FIGS. 7A and 7B. Hereinafter, description will be given below according to each of steps.

(Step SA1) A first reference value (%) which is a reference value based on which it is determined to perform adjustment by way of temperature control and a second reference value (%) which is a reference value based on which it is determined to perform mechanical adjustment are read as reference values of a tie bar balance. In addition, the first reference value (%) and the second reference value (%) are stored as setting data in advance in a storage device of the controller 51.

(Step SA2) The stretch amount of each tie bar 41 during clamping is measured by the tie bar sensor 42.

(Step SA3) The stretch amount of each of the tie bar 41 is converted into a clamping force value of the tie bar 41. A value obtained by conversion is a converted clamping force value.

(Step SA4) An average value (average clamping force value) of converted clamping force values is calculated from the converted clamping force value of each tie bar 41. Further, a difference between the converted clamping force value of each tie bar 41 and the calculated average clamping force value is calculated to calculate a maximum value and a minimum value of the difference value.

(Step SA5)

Tie bar balance(%)=[(maximum value−minimum value)/average clamping force value]×100 is calculated using the average clamping force value and the maximum value and the minimum value of the difference between the converted clamping force value of each tie bar 41 and the average clamping force value, calculated in step SA4, so that the tie bar balance is calculated and then it is determined whether the calculated tie bar balance (%) is within the first reference value (o) or not. When the calculated tie bar balance is within the first reference value (YES), the flow returns to step SA2 to continue the processing, whereas when the calculated tie bar balance is larger than the first reference value (NO), the flow proceeds to step SA6.

(Step SA6) Whether or not the tie bar balance (%) is the second reference value (%) or more is determined, and when the tie bar balance is the second reference value or more (YES), the flow proceeds to step SA7, whereas when the tie bar balance is less than the second reference value (NO), the flow proceeds to step SA8.

(Step SA7) Necessity of a mechanical adjustment is notified by way of alarm display since the tie bar balance is the second reference value or more, and therefore the tie bar balance cannot be adjusted by way of temperature control so that a mechanical portion needs to be mechanically adjusted, and then this processing is finished.

(Step SA8) The temperature of each of the divided regions of the adaptor plate 43 is measured.

(Step SA9) A minimum unit of adjustment upon a temperature rise and a minimum unit of adjustment upon a temperature drop, which are stored as setting data in advance in the storage device of the controller 51, are read. Further, a target value of a mold temperature is also set.

(Step SA10) Whether or not the temperatures of the divided regions of the adaptor plate 43 near the tie bars 41 other than the tie bar 41 whose converted clamping force value has a minimum difference with respect to the average clamping force value calculated in step SA4 are a mold temperature or more is determined. When the temperatures of the divided regions are the mold temperature or more (YES), the flow proceeds to step SA11, whereas when the temperatures are less than the mold temperature (NO), the flow proceeds to step SA16.

(Step SA11) Whether or not the clamping force of the tie bar 41 near a heated portion of the adaptor plate 43 is the average clamping force value or more calculated by the processing in step SA4 is determined. When the clamping force of the tie bar 41 is the average clamping force value or more (YES), the flow proceeds to step SA12, whereas when the clamping force is less than the average clamping force value (NO), the flow proceeds to step SA16.

(Step SA12) A target temperature upon a temperature drop is determined.

(Step SA13) Heating the divided regions of the adaptor plate 43 corresponding to the tie bars 41 whose converted clamping forces are the average clamping force value or more is stopped.

(Step SA14) The temperature of each divided region of the adaptor plate 43 is measured.

(Step SA15) Whether or not the measured temperatures of divided regions drop to the target temperature determined in step SA12 is determined, and when the temperatures drop to the target temperature (YES), the flow returns to step SA2 to continue this processing, whereas when the temperatures do not drop to the target temperature (NO), the flow returns to step SA13.

(Step SA16) A target temperature upon a temperature rise is determined.

(Step SA17) The divided regions of the adaptor plate 43 corresponding to the tie bars 41 whose converted clamping forces are the minimum value are heated.

(Step SA18) The temperature of each divided region of the adaptor plate 43 is measured.

(Step SA19) Whether or not the measured temperatures of the divided regions rise to the target temperature determined in step SA16 is determined, and when the temperatures rise to the target temperature (YES), the flow returns to SA2 to continue this processing, whereas when the temperatures do not rise to the target temperature (NO), the flow returns to step SA17.

Second Embodiment

In the present embodiment, instead of measuring stretch amounts of tie bars 41 using tie bar sensors 42 as in the above-described first embodiment, distances between a fixed platen 33 and a movable platen 30 are measured, a platen parallelism is calculated from the measurement results and the temperature of an adaptor plate 43 is adjusted based on the calculation results to adjust the platen parallelism.

Figure 3:
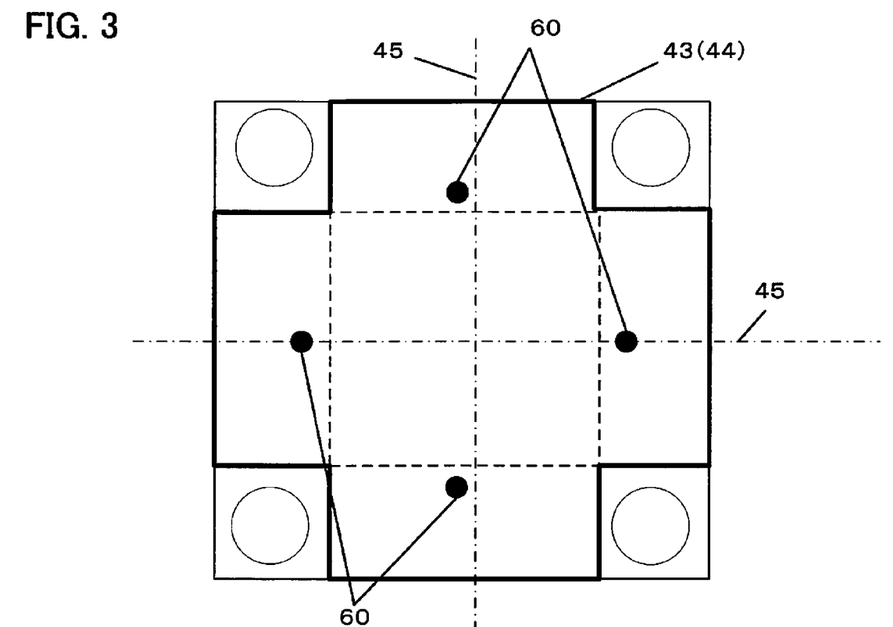
FIG. 3 is a view illustrating an example where distance sensors are arranged in the adaptor plate near the points at which a centerline of a mold and an outer periphery of the mold intersect.
Figure 4:
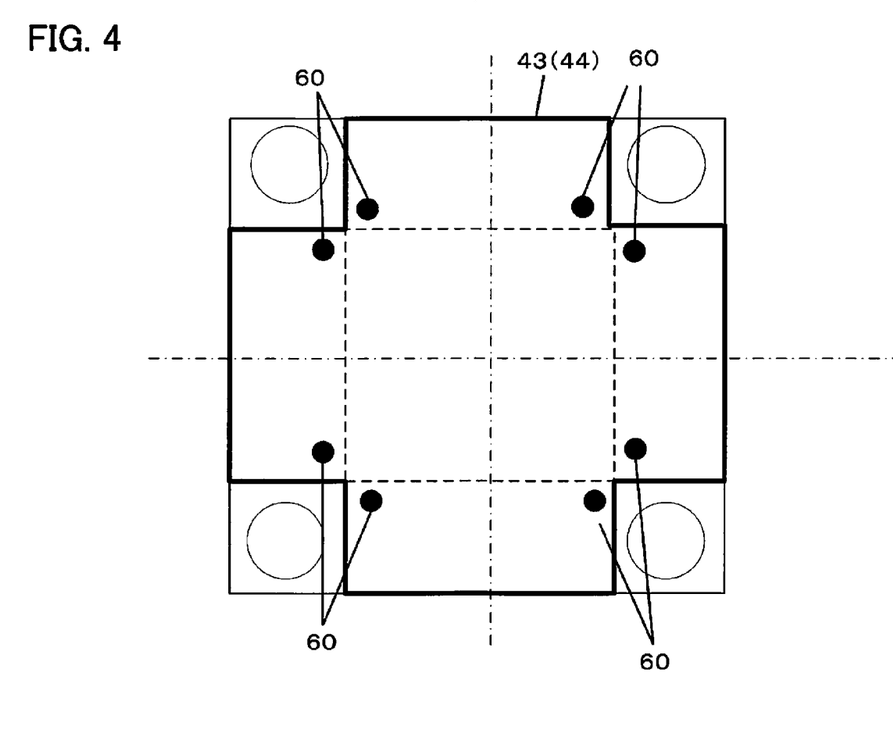
FIG. 4 is a view illustrating an example where distance sensors are arranged in the adaptor plate near the four corners of the mold.

Distance sensors 60 which measure distances between the fixed platen 33 and the movable platen 30 are provided on the adaptor plate 43 which is provided between the movable platen 30 and a movable-side mold 40a and on an adaptor plate 44 which is provided between the fixed platen 33 and a fixed-side mold 40b. Eddy current meters or laser displacement meters can be used for the distance sensors 60. Positions to install the distance sensors 60 on the adaptor plates 43 and 44 may be near the points at which a center line 45 of a mold 40 and an outer periphery of the mold intersect as illustrated in FIG. 3 or may be near the four corners of the mold 40 as illustrated in FIG. 4.

A controller 51 of an injection molding machine M controls temperatures of members provided with temperature sensors 54 using a temperature adjusting device 52 such that the distances between the fixed platen 33 and the movable platen 30 measured by the distance sensors 60 are equal when the toggle 32 is in a locked-up state.

Figure 8A:
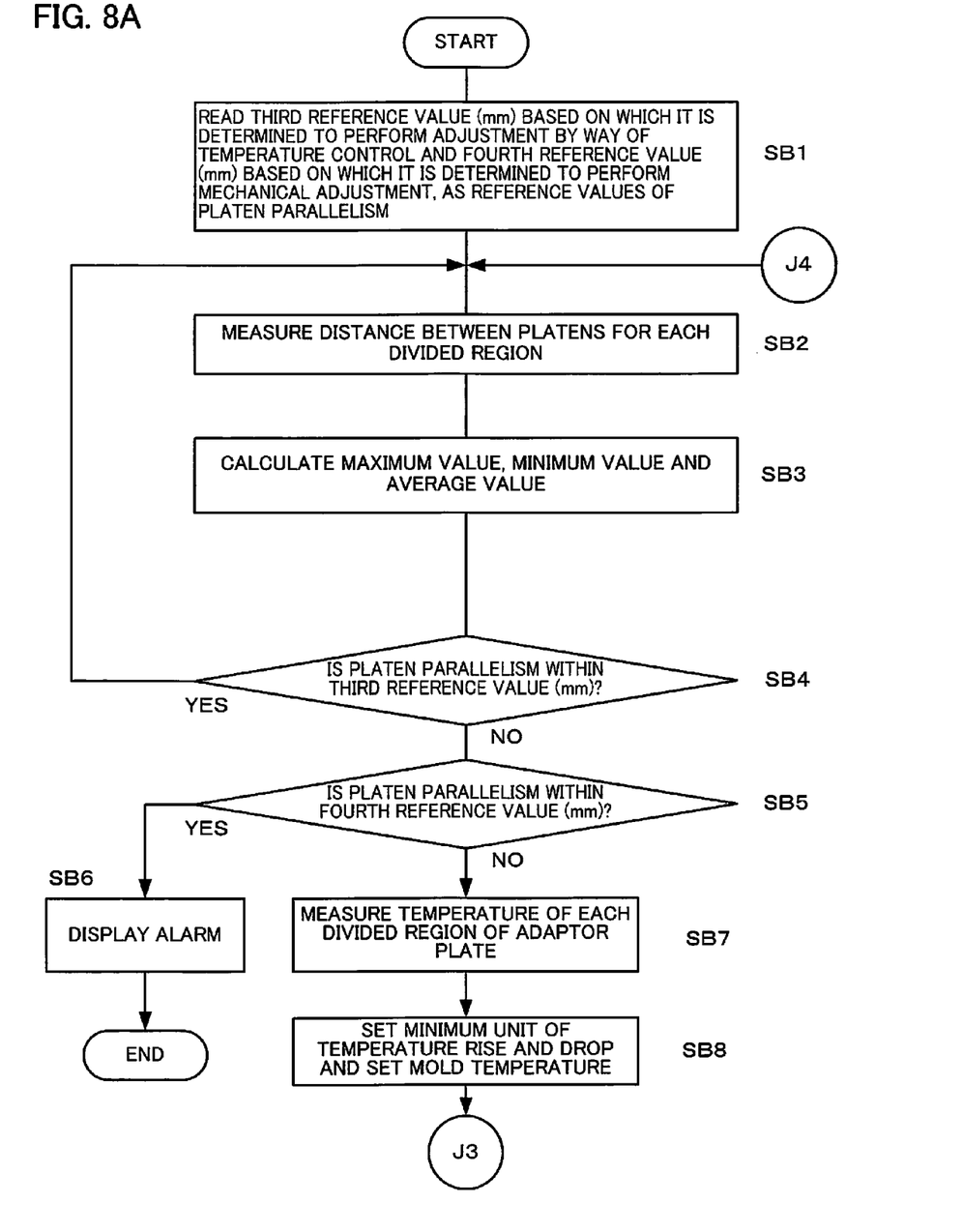
FIGS. 8A and 8B are flowcharts explaining procedures of processing executed by a clamping device according to a second embodiment of the present invention to measure a platen parallelism and adjust a temperature.
Figure 8B:
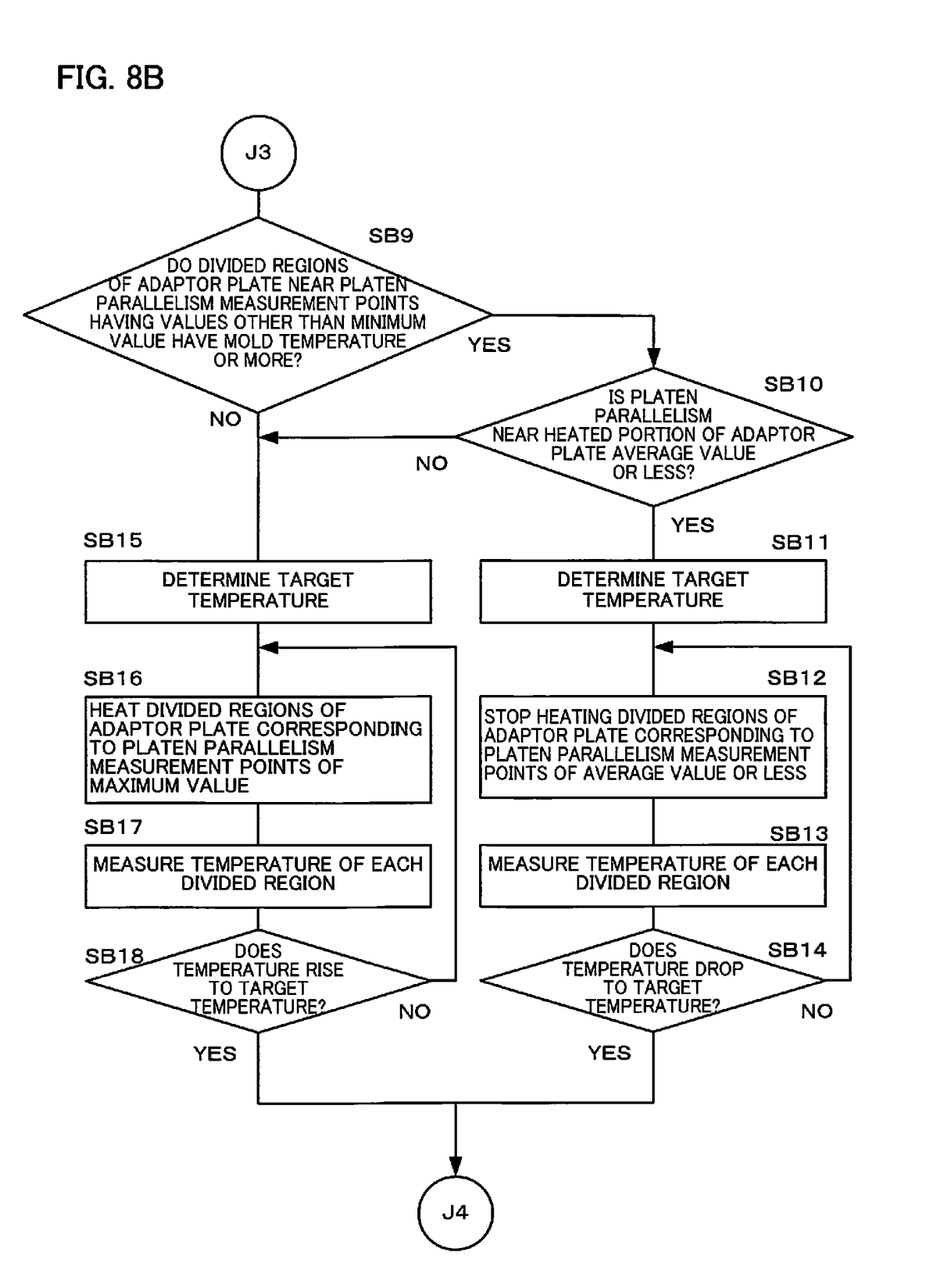

Next, procedures of processing executed by a clamping device according to the present embodiment to measure a platen parallelism and adjust a temperature will be described using flowcharts in FIGS. 8A and 8B. Hereinafter, description will be given below according to each of steps.

(Step SB1) A third reference value (mm) which is a reference value based on which it is determined to perform adjustment by way of temperature control and a fourth reference value (mm) which is a reference value based on which it is determined to perform mechanical adjustment are read as reference values of the platen parallelism. In addition, the third reference value (mm) and the fourth reference value (mm) are stored as setting data in advance in a storage device of the controller 51.

(Step SB2) Distances between the fixed platen 33 and the movable platen 30 upon clamping are measured by the distance sensors 60 for each of the divided regions of the adaptor plates 43 and 44.

(Step SB3) A maximum value, a minimum value and an average value of the distances between the fixed platen 33 and the movable platen 30 are calculated from the measurement results of the distance sensors 60.

(Step SB4) The platen parallelism is calculated from a difference between the maximum value and the minimum value calculated in step SB3, and whether or not the calculated platen parallelism (mm) is within the third reference value (mm) is determined. When the platen parallelism is within the third reference value (YES), the flow returns to step SB2 to continue this processing, whereas when the platen parallelism is larger than the third reference value (NO), the flow proceeds to step SB5.

(Step SB5) Whether or not the platen parallelism (mm) is the fourth reference value (mm) or more is determined, and when the platen parallelism is the fourth reference value or more (YES), the flow proceeds to step SB6, whereas when the platen parallelism is less than the fourth reference value (NO), the flow proceeds to step SB7.

(Step SB6) Necessity of a mechanical adjustment is notified by way of alarm display since the platen parallelism (mm) is the fourth reference value (mm) or more, and therefore the platen parallelism cannot be adjusted by way of temperature control so that a mechanical portion needs to be mechanically adjusted, and then this processing is finished.

(Step SB7) The temperature of each of the divided regions of the adaptor plate 43 is measured.

(Step SB8) A minimum unit of adjustment upon a temperature rise and a minimum unit of adjustment upon a temperature drop, which are stored as setting data in advance in the storage device of the controller 51, are read. Further, a target value of a mold temperature is also set.

(Step SB9) Whether or not temperatures of the divided regions of the adaptor plate near the platen parallelism measurement points having values other than the minimum value calculated in step SB3 are the mold temperature or more is determined. When the temperatures of the divided regions are the mold temperature or more (YES), the flow proceeds to step SB10, whereas when the temperatures are less than the mold temperature (NO), the flow proceeds to step SB15.

(Step SB10) Whether or not the platen parallelism (mm) near a heated portion of the adaptor plate 43 is the average value (mm) calculated by the processing in step SB3 is determined. When the platen parallelism is the average value or less (YES), the flow proceeds to step SB11, whereas when the platen parallelism is larger than the average value (NO), the flow proceeds to step SB15.

(Step SB11) A target temperature upon a temperature drop is determined.

(Step SB12) Heating the divided regions of the adaptor plate 43 corresponding to the platen parallelism measurement points at which distances between the fixed platen 33 (a platen parallelism measurement point on the adaptor plate 44) and the movable platen 30 (a platen parallelism measurement point on the adaptor plate 43) are the average value or less is stopped.

(Step SB13) The temperature of each divided region of the adaptor plate 43 is measured.

(Step SB14) Whether or not the measured temperatures of the divided regions drop to the target temperature determined in step SB11 is determined, and when the temperatures drop to the target temperature (YES), the flow returns to step SB2 to continue this processing, whereas when the temperatures do not drop to the target temperature (NO), the flow returns to step SB12.

(Step SB15) A target temperature upon a temperature rise is determined.

(Step SB16) The divided regions of the adaptor plate corresponding to platen parallelism measurement points at which distances between the fixed platen 33 (the platen measurement point on the adaptor plate 44) and the movable platen 30 (the platen parallelism measurement point on the adaptor plate 43) are the maximum value are heated.

(Step SB17) The temperature of each divided region of the adaptor plate 43 is measured.

(Step SB18) Whether or not the measured temperatures of the divided regions rise to the target temperature determined in step SB15 is determined, and when the temperatures rise to the target temperature (YES), the flow returns to step SB2 to continue this processing, whereas when the temperatures do not rise to the target temperature (NO), the flow returns to step SB16.

Although the adaptor plates 43 and 44 are provided to both of the fixed platen 33 and the movable platen 30 in these embodiments, and the temperatures of both of the adaptor plates 43 and 44 are adjusted, an adaptor plate can be provided to only one of platens.

Further, although the temperature adjusting devices 52 are individually provided to each one of regions of the adaptor plates 43 and 44 in these embodiments, the temperature adjusting devices do not need to be individually provided at all times. For example, only one temperature adjusting device 52 may be configured to individually control the temperature of each of the divided regions as long as that temperature adjusting device can individually adjust the temperature of each of those regions.

Although thermocouples are used for the temperature sensors 54 according to these embodiments, the temperature sensors are not limited to thermocouples and temperature sensors of other systems can also be used.

Further, although, in the above-described second embodiment, one set of the distance sensor 60 which measure distances between the fixed platen 33 and the movable platen 30 is arranged near each of the points at which the center line 45 of the mold 40 and the outer periphery of the mold intersect as illustrated in FIG. 3 (accordingly, total of four sets of the distance sensor 60 are arranged in this case), or two sets of the distance sensor 60 are arranged near each of the four corners of the mold 40 as illustrated in FIG. 4 (accordingly, total of eight sets of the distance sensor 60 are arranged in this case), arrangement positions and the number of the distance sensors 60 to be arranged can be adequately changed.

Third Embodiment

According to the present embodiment, a molded article is measured and a target temperature of a temperature of each of divided regions of an adaptor plate is set based on the measurement results. Upon setting of this target temperature, the target temperature is set to the temperature of each of the divided regions such that a conforming molded article can be obtained while measurement results are evaluated. When, for example, molded articles are measured and the thickness of each of these molded articles varies, a setting value of the target temperature of a divided region of the adaptor plate that corresponds to a thick portion of the molded article is increased. By so doing, the temperature of each divided region of the adaptor plate is controlled such that the thickness of the molded article becomes uniform.

The invention claimed is:

1. A clamping device of an injection molding machine in which a rear platen and a fixed platen are coupled by a plurality of tie bars and corresponding nuts and in which a movable platen is arranged to be guided by the tie bars, the clamping device comprising:
    an adaptor plate which is provided between the fixed platen and a fixed-side mold to be fixed to the fixed platen, and/or between the movable platen and a movable-side mold to be fixed to the movable platen;
    a temperature measuring unit configured to measure a temperature of each of a plurality of divided regions of the adaptor plate;
    a temperature adjusting unit configured to adjust the temperature of each of the plurality of divided regions of the adaptor plate; and
    a control unit configured to cause the temperature adjusting unit to adjust the temperature of each of the plurality of divided regions of the adaptor plate when a reference value is between a first reference value and a second reference value,
    wherein
        the first reference value is a value based on which it is determined to perform adjustment by way of temperature control, and
        the second reference value is a value based on which it is determined to perform mechanical adjustment, the mechanical adjustment comprising adjusting the nuts when the reference value is at or greater than the second reference value.

2. The clamping device of the injection molding machine according to claim 1, further comprising:
    distance sensors configured to measure distances between the fixed platen and the movable platen, wherein
    the distance sensors are provided above the adaptor plate, the injection molding machine further comprises a toggle connecting the rear platen and the movable platen, and
    the control unit is configured to control the temperature adjusting unit to adjust the temperature of each of the divided regions of the adaptor plate such that the distances between the fixed platen and the movable platen measured by the distance sensors are equal when the toggle is locked up.

3. The clamping device of the injection molding machine according to claim 1, further comprising:
    a plurality of tie bar sensors each provided to one of the plurality of tie bars and configured to measure a stretch amount of the corresponding tie bar; and
    the control unit is configured to control the temperature adjusting unit to adjust the temperature of each of the divided regions of the adaptor plate such that the stretch amount of each of the plurality of tie bars measured by the tie bar sensors is equal.

4. The clamping device of the injection molding machine according to claim 1, wherein the temperature adjusting unit is one of an electric heater, an electric heating/cooling element and a temperature controller which uses a fluid.

5. The clamping device of the injection molding machine according to claim 1, further comprising:
    a target temperature setting unit configured to set a target temperature of the temperature adjusting unit for each of the plurality of regions.

6. The clamping device of the injection molding machine according to claim 1, wherein the reference value comprises at least one of
    a platen parallelism between a mold attachment surface of the fixed platen and a mold attachment surface of the movable platen, or
    a tie bar balance of clamping forces of the tie bars.

* * * * *